United States Patent
Darrah, Jr.

(10) Patent No.: US 11,945,454 B2
(45) Date of Patent: Apr. 2, 2024

(54) VEHICLE MAXIMUM SPEED LIMITER BYPASS SYSTEM

(71) Applicant: PACCAR Inc, Bellevue, WA (US)

(72) Inventor: Leslie Lee Darrah, Jr., Argyle, TX (US)

(73) Assignee: PACCAR Inc, Bellevue, WA (US)

( * ) Notice: Subject to any disclaimer, the term of this patent is extended or adjusted under 35 U.S.C. 154(b) by 192 days.

(21) Appl. No.: 16/386,744

(22) Filed: Apr. 17, 2019

(65) Prior Publication Data
US 2020/0331487 A1  Oct. 22, 2020

(51) Int. Cl.
| | | |
|---|---|---|
| B60W 50/08 | (2020.01) | |
| B60K 35/00 | (2006.01) | |
| B60K 37/02 | (2006.01) | |
| B60W 30/14 | (2006.01) | |

(52) U.S. Cl.
CPC .......... B60W 50/085 (2013.01); B60K 35/00 (2013.01); B60K 37/02 (2013.01); B60W 30/146 (2013.01); B60K 2370/782 (2019.05)

(58) Field of Classification Search
CPC . B60W 30/146; B60W 30/143; B60W 30/162
See application file for complete search history.

(56) References Cited

U.S. PATENT DOCUMENTS

| | | |
|---|---|---|
| 3,597,730 A | 8/1971 | McClellan, Sr. et al. |
| 3,878,915 A | 4/1975 | Purland et al. |
| 3,985,195 A | 10/1976 | Tixier |
| 4,531,489 A | 7/1985 | Sturdy |
| 4,887,684 A | 12/1989 | King |
| 6,112,142 A | 8/2000 | Shockley et al. |
| 6,161,072 A | 12/2000 | Clapper |

(Continued)

FOREIGN PATENT DOCUMENTS

WO   WO-2004007930 A2 *  1/2004  ............. B60K 31/00

OTHER PUBLICATIONS

Oval News, "What Intelligent Speed Limiter UX looks like on a 2017 Range Rover," Feb. 3, 2017, URL=https://www.ovalnews.com/2017/02/what-intelligent-speed-limiter-looks-like-on-a-2017-range-rover.html, download date May 9, 2019, 6 pages.

*Primary Examiner* — Rachid Bendidi
*Assistant Examiner* — Selena M Jin
(74) *Attorney, Agent, or Firm* — Seed IP Law Group LLP (57) ABSTRACT

Systems and methods for dynamically limiting the road speed of a vehicle are provided herein. The method includes limiting the speed of the vehicle to a predetermined first speed under normal operating conditions. The method further includes selectively engaging an override condition for an activation interval responsive to an operator generated input. The override condition may be limited to a determined number of times in an activation assessment interval. During an activation interval of the override condition, the vehicle can exceed the predetermined first speed by a specified offset that defines a second speed greater than the first speed. The activation interval may be a period of time or a distance. The override condition is not available when the number of activations in the activation assessment interval exceeds a threshold value. The activation assessment interval may be defined by a period of time, a distance, an event or action, etc.

22 Claims, 4 Drawing Sheets

(56) References Cited

U.S. PATENT DOCUMENTS

| | | | |
|---|---|---|---|
| 6,202,021 B1* | 3/2001 | Kresse | B60K 31/0008 |
| | | | 701/93 |
| 6,347,272 B2 | 2/2002 | Flammersfeld et al. | |
| 7,711,468 B1 | 5/2010 | Levy | |
| 2003/0023364 A1* | 1/2003 | Schmitz | B60W 30/146 |
| | | | 701/93 |
| 2004/0017281 A1* | 1/2004 | Dix | B60R 25/04 |
| | | | 340/5.72 |
| 2007/0156321 A1 | 7/2007 | Schad | |
| 2014/0121930 A1 | 5/2014 | Allexi et al. | |
| 2014/0121933 A1 | 5/2014 | Slaton et al. | |
| 2014/0214305 A1* | 7/2014 | Eriksson | F02D 11/105 |
| | | | 701/102 |
| 2016/0339870 A1* | 11/2016 | Morgan | G06Q 40/12 |
| 2017/0291604 A1 | 10/2017 | Mukkala, II et al. | |
| 2018/0339706 A1* | 11/2018 | Biondo | G09B 19/16 |
| 2020/0096358 A1* | 3/2020 | Dal Bo | G01C 21/3626 |
| 2020/0307578 A1* | 10/2020 | Magolan | B60W 20/00 |

* cited by examiner

VEHICLE MAXIMUM SPEED LIMITER BYPASS SYSTEM

BACKGROUND

Technical Field

The present disclosure generally relates to vehicle speed control systems, and more particularly, to vehicle maximum speed limiter systems.

Description of the Related Art

Current federal regulations for certain types of motor vehicles may set standards for allowable greenhouse gas (GHG) emissions. Included in these regulations may be provisions related to vehicle speed limiters (VSLs), which actively limit vehicle speed to a maximum speed that depends on vehicle programming and operating conditions. Because vehicles tend to be more fuel efficient at lower speeds, limiting a vehicle's maximum speed with a VSL increases the overall fuel efficiency of the vehicle and decreases the GHG emissions of the vehicle. In addition to increasing GHG emissions, operating a vehicle at higher maximum speeds can result in higher fuel consumption and, thus, may result in increased operating costs. In the field of surface transportation and particularly in the long-haul trucking industry, even small improvements in fuel efficiency can reduce annual operating costs significantly. Further, it may be desirable to limit a vehicle's speed to comply with the specified ratings for the tires of the vehicle, or at least to not exceed such ratings for extended periods of time.

One known technique for limiting vehicle speed includes the use of a vehicle speed limiter or governor that prevents the engine from rotating above a predetermined engine speed. This technique, however, may be too limiting to the driver for some applications and thus, may frustrate the driver and restrict the driver's ability to control the vehicle. For example, under certain circumstances, avoiding hazards may require that the operator exceed this predetermined speed for a limited period of time in order to execute an evasive maneuver. In addition, normal operating maneuvers, such as passing, may also require that operator exceed the maximum vehicle speed for a short time in order to more safely pass another vehicle. Thus, there is a need for a vehicle speed limiters that reduce GHG emissions, improve vehicle operating efficiency, and comply with tire specifications while still giving the vehicle operator the flexibility to exceed this speed for limited amounts of time, distance, or both.

BRIEF SUMMARY

A method of limiting a maximum road speed of a vehicle, the method may be summarized as including limiting, by at least one processor of the vehicle, a road speed of the vehicle to a first speed; receiving, by the at least one processor, a request for a maximum speed override; determining, by the at least one processor, a number of times the maximum speed override has been activated during a current activation assessment interval; and in response to determining that the number of times the maximum speed override has been activated during the current activation assessment interval is below a threshold number of activations limiting, by the at least one processor, the road speed of the vehicle to a second speed higher than the first speed for an activation interval; and limiting, by the at least one processor, the road speed of the vehicle to the first speed after the activation interval. Determining a number of times the maximum speed override has been activated during a current activation assessment interval may include determining a number of times the maximum speed override has been activated during a current activation assessment interval, the current activation assessment interval being defined by a time period. Determining a number of times the maximum speed override has been activated during a current activation assessment interval may include determining a number of times the maximum speed override has been activated during a current activation assessment interval, the current activation assessment interval being defined by a distance. Determining a number of times the maximum speed override has been activated during a current activation assessment interval may include determining a number of times the maximum speed override has been activated during a current activation assessment interval, the current activation assessment interval being defined by a current trip of the vehicle. Receiving a request for a maximum speed override may include receiving the request for the maximum speed override from a user interface positioned at or proximate to a steering wheel of the vehicle, a dashboard of the vehicle, or a pedal of the vehicle.

The method may further include causing a user interface of the vehicle to present at least one of the number of times the maximum speed override has been activated during the current activation assessment interval; or a difference between the threshold number of activations and the number of times the maximum speed override has been activated during the current activation assessment interval.

The method may further include causing a user interface of the vehicle to present an indication of a current status of the current activation assessment interval. The activation assessment interval may include a time period or a distance, and causing a user interface of the vehicle to present an indication of a current status of the current activation assessment interval comprises displaying a remaining time or remaining distance, respectively, of the activation assessment interval.

The method may further include receiving, by the at least one processor, values for the first speed and the second speed; and storing, by the at least one processor, the received values for the first speed and the second speed in a nontransitory processor-readable storage medium.

The method may further include receiving, by the at least one processor, a value for the threshold number of activations; and storing, by the at least one processor, the received value for the threshold number of activations in a nontransitory processor-readable storage medium.

The method may further include receiving, by the at least one processor, a parameter that defines the duration of the activation interval; and storing, by the at least one processor, the parameter that defines the duration of the activation interval in a nontransitory processor-readable storage medium. Receiving a parameter that defines the activation assessment interval may include receiving a parameter that specifies at least one of a time period or a distance.

A vehicle speed management system operative to limit a maximum road speed of a vehicle, the vehicle speed management system may be summarized as including at least one nontransitory processor-readable storage medium that stores at least one of processor-executable instructions or data; and at least one processor communicatively coupled to the at least one nontransitory processor-readable storage medium, in operation, the at least one processor limits a road speed of the vehicle to a first speed; receives a request for a maximum speed override; determines a number of times the maximum speed override has been activated during a current activation assessment interval; and in response to a determination that the number of times the maximum speed override has been activated during the current activation assessment interval is below a threshold number of activations limits the road speed of the vehicle to a second speed higher than the first speed for an activation interval; and limits the road speed of the vehicle to the first speed after the activation interval. The current activation assessment interval may be defined by a time period. The current activation assessment interval may be defined by a distance. The current activation assessment interval may be defined by a current trip of the vehicle. The at least one processor may receive the request for the maximum speed override from a user interface positioned at or proximate to a steering wheel of the vehicle, a dashboard of the vehicle, or a pedal of the vehicle.

A vehicle speed management system operative to limit a maximum road speed of a vehicle, the vehicle speed management system may be summarized as including at least one nontransitory processor-readable storage medium that stores at least one of processor-executable instructions or data; and at least one processor communicatively coupled to the at least one nontransitory processor-readable storage medium, in operation, the at least one processor limits a road speed of the vehicle to a first speed; receives a request for a maximum speed override from an operator of the vehicle via a control input interface; determines a number of times the maximum speed override has been activated during a current activation assessment time period; and in response to a determination that the number of times the maximum speed override has been activated during the current activation assessment time period is below a threshold number of activations limits the road speed of the vehicle to a second speed higher than the first speed for an activation interval; and limits the road speed of the vehicle to the first speed after the activation interval; causes a user interface of the vehicle to present at least one of the number of times the maximum speed override has been activated during the current activation assessment interval; a difference between the threshold number of activations and the number of times the maximum speed override has been activated during the current activation assessment interval; or an indication of a current status of the current activation assessment interval.

The vehicle speed management system may further include receiving, by the at least one processor, programmable settings data that comprises at least one of values for the first speed and the second speed, a value for the threshold number of activations, or a parameter that defines the duration of the activation interval; and storing, by the at least one processor, the received programmable setting data in the at least one nontransitory processor-readable storage medium. The at least one processor may receive the request for the maximum speed override from a user interface positioned at or proximate to a steering wheel of the vehicle, a dashboard of the vehicle, or a pedal of the vehicle.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for dynamically limiting a vehicle's maximum road speed. In at least some implementations, the method may include limiting the speed of the vehicle to a predetermined first speed (e.g., 65 mph) under normal operating conditions. The method may further include selectively engaging an override condition for an activation interval in response to an operator generated input. The override condition may be limited to a determined number of times in an activation assessment interval. During the override condition, the vehicle can exceed the predetermined first speed by a specified offset that defines a second speed (e.g., 80 mph) greater than the first speed. Such feature allows the vehicle to pass a slower moving or matched speed vehicle. The override condition may then not be available when the number of activations in the activation assessment interval exceeds a threshold value until a subsequent activation assessment interval begins. Thus, the operator may increase the speed above the normal maximum speed under certain limited conditions, buy may not continuously operate the vehicle at speeds greater than the normal operating speed. The activation assessment interval may be defined by a period of time, a distance, one or more events or actions, etc., as discussed further below.

The present disclosure describes examples of dynamic vehicle speed limiter (DVSL) systems and methods thereof suitable for use in vehicles, such as Class 8 trucks or other vehicles. Generally, the examples of the DVSL systems and methods described herein aim to provide a Normal Speed Limit (NSL), such as 65 mph or 70 mph, which is the maximum vehicle speed under normal operating conditions. The NSL may be set by the vehicle original equipment manufacturer (OEM), the owner of the vehicle, or other entity, and may specified to ensure particular criteria are met (e.g., governmental regulations, fleet fuel economy goals, tire ratings).

Recognizing that it is sometimes allowable and advantageous to exceed the NSL for short durations, the disclosed DVSL system allows a vehicle operator to exceed the values of the NSL under certain operating conditions. That is, the DVSL system allows the operator to exceed the NSL to an "Override Condition Speed Limit" (OCSL) which is greater than the NSL, e.g., by an offset speed. As a non-limiting example, the NSL may be set to 65 mph, and the OCSL may be set to 80 mph. The OCSL is conditionally available to the vehicle operator to temporarily increase the maximum vehicle speed for an activation interval (e.g., 30 seconds, 1 minute, 3 minutes), in which the activation interval is determined to be of a duration sufficient to allow the operator to perform a maneuver, such as passing another vehicle on the highway, merging into traffic, etc. As will be discussed in detail below, the availability of the override speed may depend upon various programmed parameters, as well as the vehicle operating history.

Figure 1:
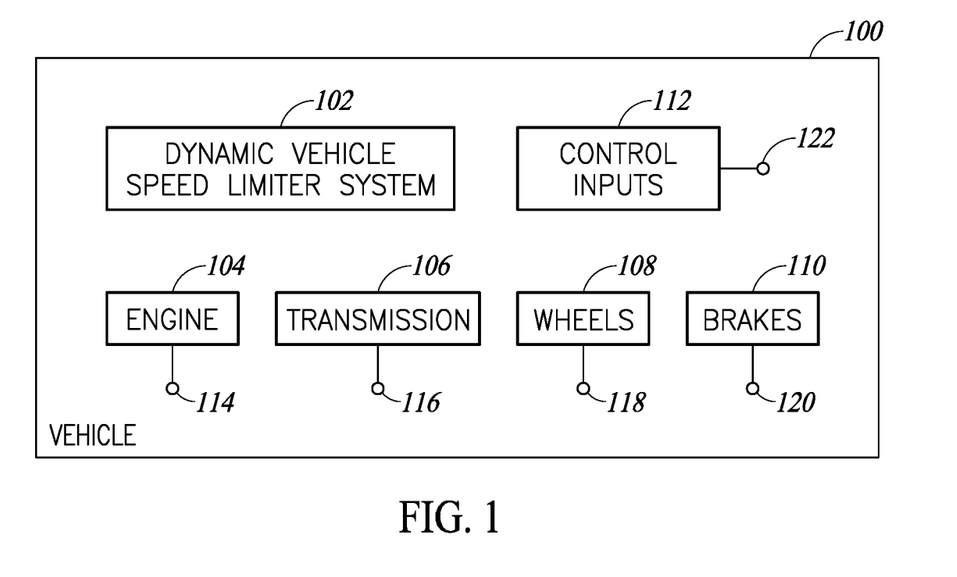
FIG. 1 is a schematic block diagram of a vehicle that includes a dynamic vehicle speed limiter (DVSL) system, according to one non-limiting illustrated implementation.

FIG. 1 is a schematic diagram of a vehicle 100, such as a Class 8 tractor or other vehicle, suitable for comprising a DVSL system 102 in accordance with at least one embodiment of the present disclosure. It should be appreciated that aspects of the present disclosure may be implemented in any particular type of vehicle for which the vehicle speed is to be limited, such as vehicles that include an internal combustion engine (e.g., gas, diesel, etc.), a hybrid drive train, an electric motor, etc.

The vehicle 100 in the exemplary embodiment shown in FIG. 1 includes an electronically controlled engine 104 coupled to a transmission 106 which in turn is coupled to a plurality of wheels 108. The transmission 106 may have an output shaft coupled to a drive shaft. The vehicle 100 may have at least two axles, including as a steer axle and one or more drive axles. Each axle supports corresponding wheels 108 having service brake components 110 for monitoring the vehicle's 100 operating conditions and to effect control of the vehicle braking system. The vehicle 100 also includes various operator control inputs 112, such as an accelerator pedal, a clutch pedal, a brake pedal, a steering wheel, and a user interface. In addition, the vehicle 100 has one or more sensors, such as one or more control input sensors 122 (e.g., accelerator pedal position sensor), an engine speed sensor 114, a transmission sensor 116, a wheel speed sensor 118, and a brake sensor 120.

Figure 2:
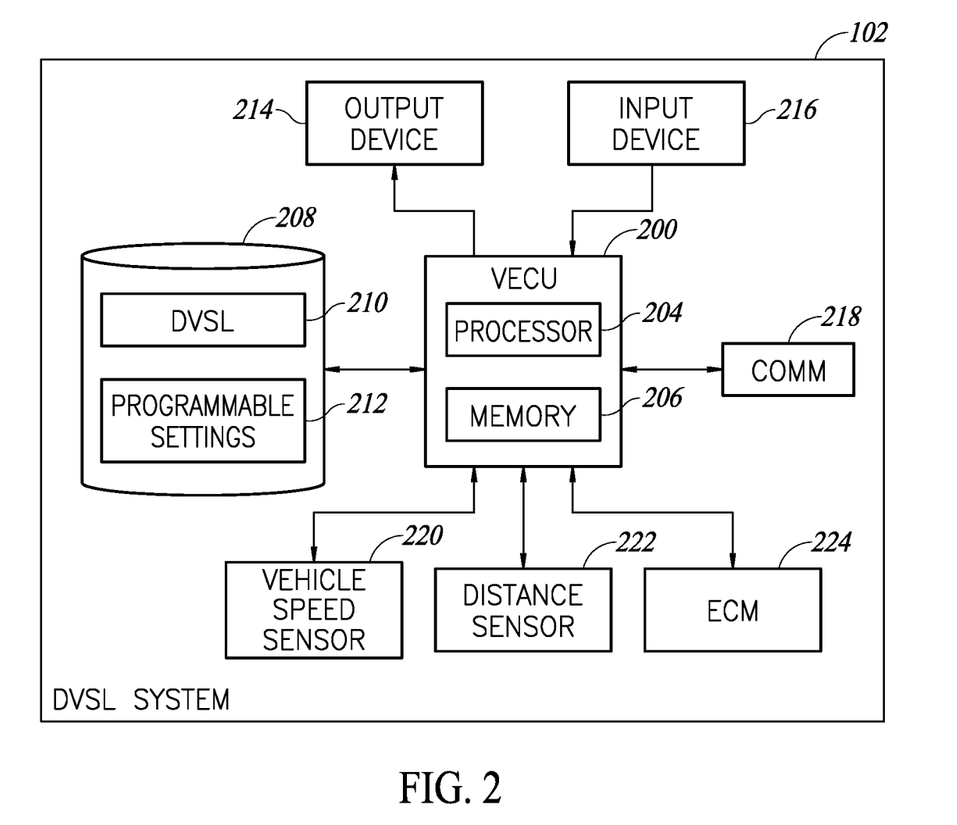
FIG. 2 is a schematic block diagram of a DVSL system, according to one non-limiting illustrated implementation.

As indicated above, the vehicle 100 is further equipped with the DVSL system 102 that includes a one or more vehicle electronic control units (VECU) 200 (FIG. 2). The VECU 200 interfaces with the engine 104 and the various sensors described herein and is configured to control the engine to limit the speed of the vehicle 100. It will be appreciated that the described vehicle 100 is exemplary only and should not be considered limiting. In this regard, alternate vehicles configurations that include different numbers and types of axles, operator control inputs, sensors, and other components, are contemplated and should be considered within the scope of the present disclosure.

FIG. 2 illustrates one embodiment of the DVSL system 102 according to various aspects of the present disclosure. The DVSL system 102 includes the VECU 200 that includes a processor 204 and memory 206. The VECU 200 may be operatively coupled to a data storage device 208 that stores a DVSL module 210 and programmable settings storage 212. The VECU 200 may also be coupled to one or more output devices 214, input devices 216, communication interfaces 218, a vehicle speed sensor module 220, a distance sensor module 222, and an engine control module (ECM) 224 operatively coupled to the engine 104. The various components of the DVSL system 102 are described further below.

In operation, the VECU 200 monitors vehicle status and causes indications to be presented via the output devices 214 (e.g., operator display) when appropriate. The output device 214 may be a type of display used in the vehicle 100 to convey information to the operator. For example, the output device 214 may include an LCD video screen display configured to display information to the operator. As another example, the output device 214 may include special purpose lighted displays, needle gauges, heads-up displays, etc. The output device 214 may additionally or alternatively include speakers or haptic feedback devices, such as vibrating motors, to provide information to the operator via audible or tactile feedback.

The VECU 200 may be implemented in a variety of hardware, software, and combination hardware/software configurations for carrying out aspects of the present disclosure. The memory 206 may include one or more types of nontransitory processor readable media (e.g., hard disk drive, optical disk drive, SSD, flash memory). The processor readable media can be, but is not limited to, an electronic, magnetic, optical, electromagnetic, infrared, or semiconductor system, apparatus or device. More specific examples (a non-exhaustive list) of the computer readable medium include a portable computer diskette (magnetic, compact flash card, secure digital, or the like), a random access memory (RAM), a read only memory (ROM), an erasable programmable read only memory (EPROM, EEPROM, or flash memory), a portable compact disc read only memory (CDROM), digital tape, and other nontransitory media.

The processor 204 may one or more of any logic processing unit, such as one or more central processing units (CPUs), microprocessors, digital signal processors (DSPs), graphics processing units (GPUs), application specific integrated circuits (ASICs), field programmable gate arrays (FPGAs), and the like. The processor 204 is configured to operate in accordance with program instructions or data stored in the memory 206 or the data storage 208. The memory may include program modules, applications, instructions, and/or the like that are executable by the processor 204.

The VECU 200 is communicatively coupled to plurality of sensors that provide status information concerning various states of the vehicle 100. For example, in the disclosed embodiment, the VECU 200 is communicatively coupled to the vehicle speed sensor module 220 configured to provide real time data about vehicle speed. The vehicle speed sensor module 220 may include or be similar to the previously mentioned wheel speed sensor 118, or can be one or more separate sensors that use any method to sense vehicle speed.

The VECU 200 can also be communicatively coupled to the distance sensor module 222 configured to provide information regarding the distance that a vehicle has traveled over its lifetime, as well as over determined periods. In at least one embodiment, the distance sensor module 222 retrieves data from the vehicle odometer or from the same sensors that provide information to the vehicle odometer. The distance sensor module 222 may also be configured to provide vehicle distance traveled over a time period, during one calendar day, during a particular trip, during a leg of a trip, during a period since the operator last stopped (e.g., overnight stop, refueling stop, meal stop), or during any other desired time span.

In the illustrated embodiment, the VECU 200 is also communicatively coupled to one or more operator input devices or modules 216 configured to provide vehicle operator input to the VECU 200. The operator input devices 216 may include an accelerator pedal position sensor, buttons, toggles, video touchscreens, keyboards, microphones, cameras, optical sensors, mechanical levers, or any other devices that allow an operator to provide input to the VECU 200.

The VECU 200 may also include one or more communication interfaces 218 that allow for wired or wireless communication of instructions or data with external devices, such as local or remote computers, servers, or other devices (e.g., smartphones, laptop computers). The communication interface 218 may facilitate any method of permitting the VECU 200 to communicate, such as through one or more LANs and/or WANs, such as the Internet, and/or cellular communications networks. The communication interface 218 may include one or more controllers or radios (e.g., network interface controllers, cellular radios, W-Fi® radios, Bluetooth® radios) for establishing communications over the network, for instance, the Internet, cellular network, a peer-to-peer network, etc.

The ECM 224 controls various aspects of the engine 104 (e.g., fuel delivery, etc.). The ECM 224 may include a processor, memory, and an I/O interface suitably interconnected via one or more buses, including but not limited to a CAN bus. Various components of the engine 104 are in communication with the ECM 224. For example, the ECM 224 may receive signals from an engine speed sensor and a coolant temperature sensor regarding the engine speed and coolant temperature, respectively. The ECM 224 may also be in communication with a starter, a decompression device and fuel injectors in order to affect these control the operation of these and other components. It will be appreciated that the ECM 224 may receive data from other sensors indicative of engine operating parameters, such as maximum road speed, etc., in order to affect appropriate timing and duration of fuel delivery, valve actuation, etc. The ECM 224 may also receive data generated directly or indirectly from operator inputs.

The ECM 224 limits the vehicle speed by controlling the engine 104 in accordance with control input received from the DVSL module 210. In at least one embodiment, the ECM 224 electronically controls the maximum vehicle speed according to input received from the VECU 200. As an example, the VECU 200 may store programming and programmable parameters associated with the vehicle speed control and the number of times the control could be changed in the memory 206. Upon driver activation, the VECU 200 communicates via a data bus to the ECM 224 requests that command the ECM to allow the max speed to be increased to the VECU programmed set values. For example, the ECM 224 may restrict or otherwise control the flow of air and fuel to the engine or control the sparks that cause combustion in the engine to limit the maximum speed of the vehicle. It should be readily apparent that the present disclosure is not limited to any particular governor or engine speed controller. In this regard, one or more of any known devices for controlling maximum vehicle speed that can be electronically controlled can be configured for use with the present DVSL system 102, and the use of such speed controllers should be considered within the scope of the present disclosure.

The components described herein as "communicatively coupled" may be coupled by any suitable means. In one embodiment, components may be connected by an internal communications network such as a vehicle bus that uses a controller area network (CAN) protocol, a local interconnect network (LIN) protocol, etc. Those of ordinary skill in the art will recognize that the vehicle bus may be implemented using any number of different communication protocols such as, but not limited to, Society of Automotive Engineers ("SAE") J1587, SAE J1922, SAE J1939, SAE J1708, or combinations thereof In other embodiments, components may be connected by other networking protocols, such as Ethernet, Bluetooth®, TCP/IP, and/or the like. In still other embodiments, components may be directly connected to each other without the use of a bus, such as by direct wired or wireless connections between the components. Embodiments of the present disclosure may be implemented using other types of currently existing or yet-to-be-developed in-vehicle communication systems without departing from the scope of the present subject matter.

As noted above, the data storage 208 may store the DVSL module 210 and the programmable settings storage 212. The data storage 208 may include a nontransitory processor-readable storage medium that has stored thereon the data described herein. One example of a store is a hard disk drive, but any other suitable nonvolatile computer-readable storage medium, such as an EEPROM, flash memory, etc., may be used.

In at least one embodiment, the data storage 208 may store data regarding past vehicle use that can be used to determine whether or not the normal speed limit override feature is available, e.g., if the override condition is allowed to be activated during a present activation assessment interval. Such information may include the number of times the override condition has been activated during a present activation assessment interval, which may be a determined amount of time (e.g., 30 minutes, 1 hour, 4 hours, 24 hours), a determined distance (e.g., 50 miles, 100 miles, 500 miles), or one or more determined events (e.g., time since the operator started the engine of the vehicle, the duration of a trip or leg of a trip). It should be appreciated that other vehicle operation information may be stored as necessary to implement various embodiments of the disclosed DVSL system 102.

The programmable setting storage 212 may be configurable to store one or more settings that may be used by the VECU 200 to determine conditions under which the maximum speed override condition should be available. The one or more settings may be set to a default value, or may be reset to a different value. In at least one embodiment, the programmable setting storage 212 may also store a lower bound value and an upper bound value for each setting. In at least one embodiment, each setting may be changed via a user interface provided within the vehicle 100 (e.g., input devices 216) or via a local or remote external device (e.g., via the communication interface 218). In at least some embodiments, each setting may be programmed during manufacture of the vehicle 100, via a service tool, etc. In at least some implementations, a fleet manager or other authorized person is able to assign the number of maximum speed increases allowed prior to a trip or during the trip via wireless (over the air) VECU programming updates.

Exemplary methods for utilizing a DVSL system as described herein to provide a dynamic maximum vehicle speed are described below. The description makes reference to various vehicle operating parameters that can be sensed and stored during vehicle operation, as well as programmable settings that can be programmed into the DVSL system by the vehicle manufacturer, the owner, the operator, or any other suitable entity, via a local or remote interface. In at least some implementations, the programmable settings may be determined in accordance with requirements that govern vehicle operation (e.g., tire ratings, emissions standards), or may be determined by owner/operator requirements.

Figure 3:
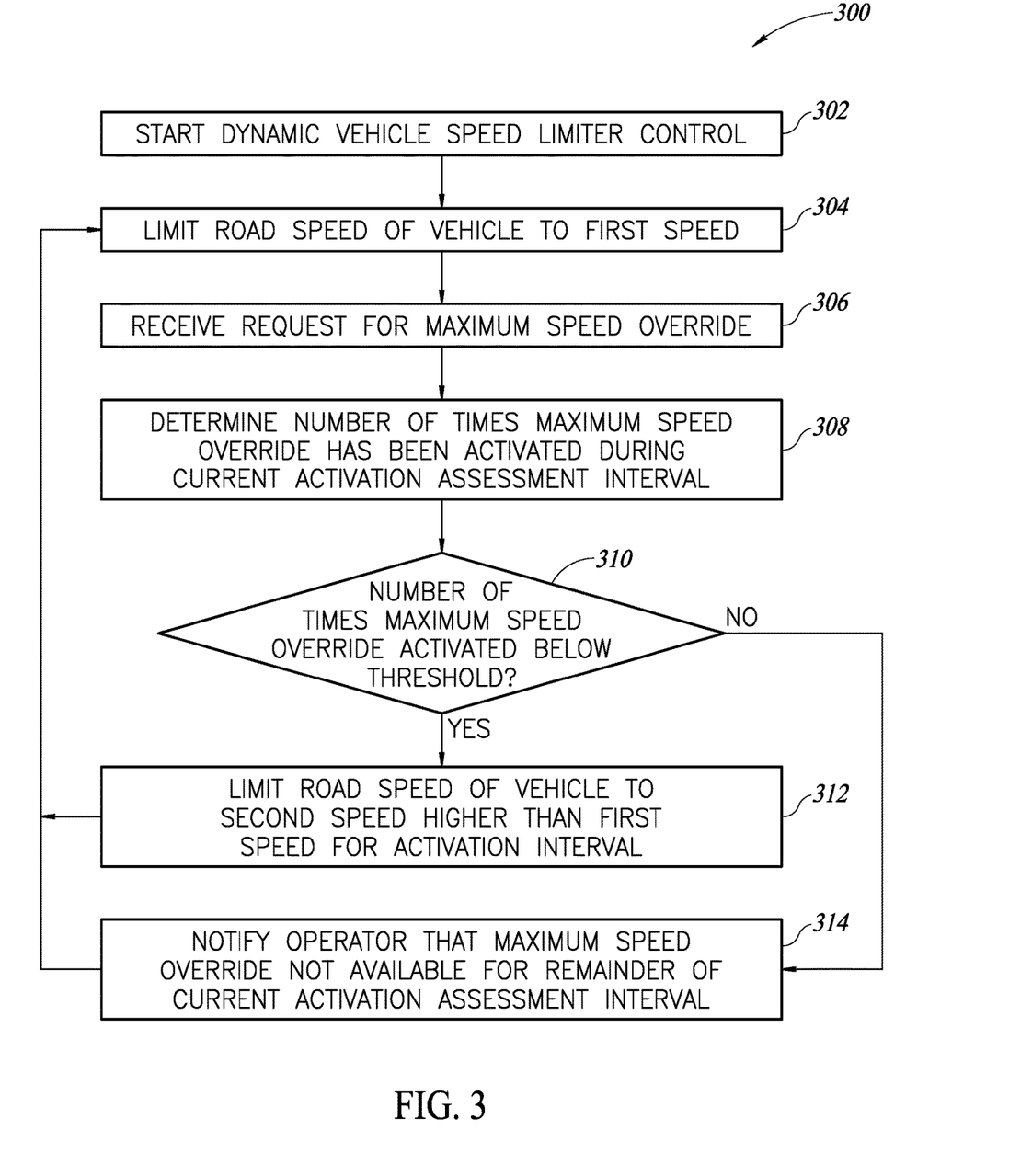
FIG. 3 is a flow diagram for a method of operating a DVSL system to dynamically limit the maximum speed of a vehicle, according to one non-limiting illustrated implementation.

FIG. 3 illustrates a flow diagram for a method 300 of operating a DVSL system (e.g., DVSL system 102) to dynamically limit the maximum speed of a vehicle. The method 300 begins at 302, wherein the DVSL system starts a dynamic vehicle speed limiter control operation for a vehicle. For example, the method 300 may start when an operator of the vehicle starts the engine of the vehicle and begins driving the vehicle on a highway or other road.

At 304, the DVSL system may limit the road speed of the vehicle to a first speed, also referred to herein as the normal speed limit (NSL). As discussed above, the DVSL system may utilize a speed control module (e.g., ECM 224) or similar device to control the maximum speed of the vehicle. For instance, the DVSL system may restrict or otherwise control the flow of air and fuel to the engine or control the sparks that cause combustion in the engine to limit the maximum speed of the vehicle to the first speed.

At 306, the DVSL system receives a request for a maximum speed override. For example, the operator of the vehicle may want to override the NSL in order to pass a slow moving or matched speed vehicle on a highway. The request may be received via a user interface that receives input from the operator. As non-limiting examples, the user interface may be a control input positioned at or proximate to a steering wheel of the vehicle, a dashboard of the vehicle, a pedal of the vehicle, etc. The control input may be any type of device operative to receive input from the operator, such as mechanical input, gesture input, voice input, etc. In at least some embodiments, the input may be received from a control input that is also used for purposes other than requesting the override condition. For example, a pedal of the vehicle or turn signal indicator may be configured to detect a particular pattern (e.g., multiple presses in quick succession) from the operator that signals a request for the maximum speed override condition.

At 308, responsive to receiving the request for maximum speed override, the DVSL system determines a number of times the maximum speed override has been activated during a current activation assessment interval. For example, the DVSL system may store the number of times the maximum speed override has been activated, and may retrieve that number for evaluation. As noted above, the activation assessment interval may be defined by a time period, a distance, an event or action (e.g., defined by a current trip of the vehicle), or other criteria.

At 310, the DVSL system determines whether the number of times the maximum speed override has been activated during the current activation assessment interval is below a determined threshold number of activations. As noted above, the threshold may be selectively programmable using a local or remote interface. As an example, if the activation assessment interval is a time period (e.g., 1 hour), the threshold may be a number (e.g., 3, 5, 10) of times the maximum speed override may be activated during the time period. As another example, if the activation assessment interval is a distance (e.g., 50 miles), the threshold may be a number of times the maximum speed override may be activated each distance interval. As another example, if the activation assessment interval is related to an action or event, such as the time period since the operator began driving after a last stop, the threshold may be a number of times the maximum speed override may be activated since the last stop in the trip.

At 312, responsive to determining that the number of times the maximum speed override has been activated is below the threshold (i.e., 310='yes'), the DVSL system limits the road speed of the vehicle to a second speed higher than the first speed for an activation interval. The second higher speed is also referred to herein as the "Override Condition Speed Limit" (OCSL). The activation interval may be an amount of time or a distance that the maximum speed override condition is activated each time the condition is enabled. For example, the activation interval may be 30 seconds, 1 minute, 3 minutes, 1 mile, 3 miles, etc. Generally, the activation interval may set to a value that provides sufficient time and distance for the operator to perform an intended maneuver, such as passing another vehicle on the highway, merging into traffic, etc. Once the activation interval has expired, the DVSL system again limits the road speed of the vehicle to the first speed (NSL) and the method 300 repeats.

At 314, responsive to determining that the number of times the maximum speed override has been activated has reached the threshold (i.e., 310='no'), the DVSL system may optionally notify the operator that the maximum speed override is not available for the remainder of the current activation assessment interval. In this case, the DVSL system continues to limit the road speed of the vehicle to the first speed (NSL) without raising the maximum speed to the OSCL. As an example, the DVSL system may provide a visual or audible notification to the operator that indicates that the maximum speed override condition is not currently available. In at least some implementations, the DVSL system may notify the operator when the current activation assessment interval will expire, or equivalently, when the next activation assessment interval will begin, so the operator will know when the maximum speed override condition will again be available for use. For example, if the activation assessment interval is one hour and the operator reaches the threshold number of activations 40 minutes into the current activation assessment interval, the DVSL system may notify the operator that the maximum override condition will be available again in 20 minutes when a new activation assessment interval begins.

Figure 4:
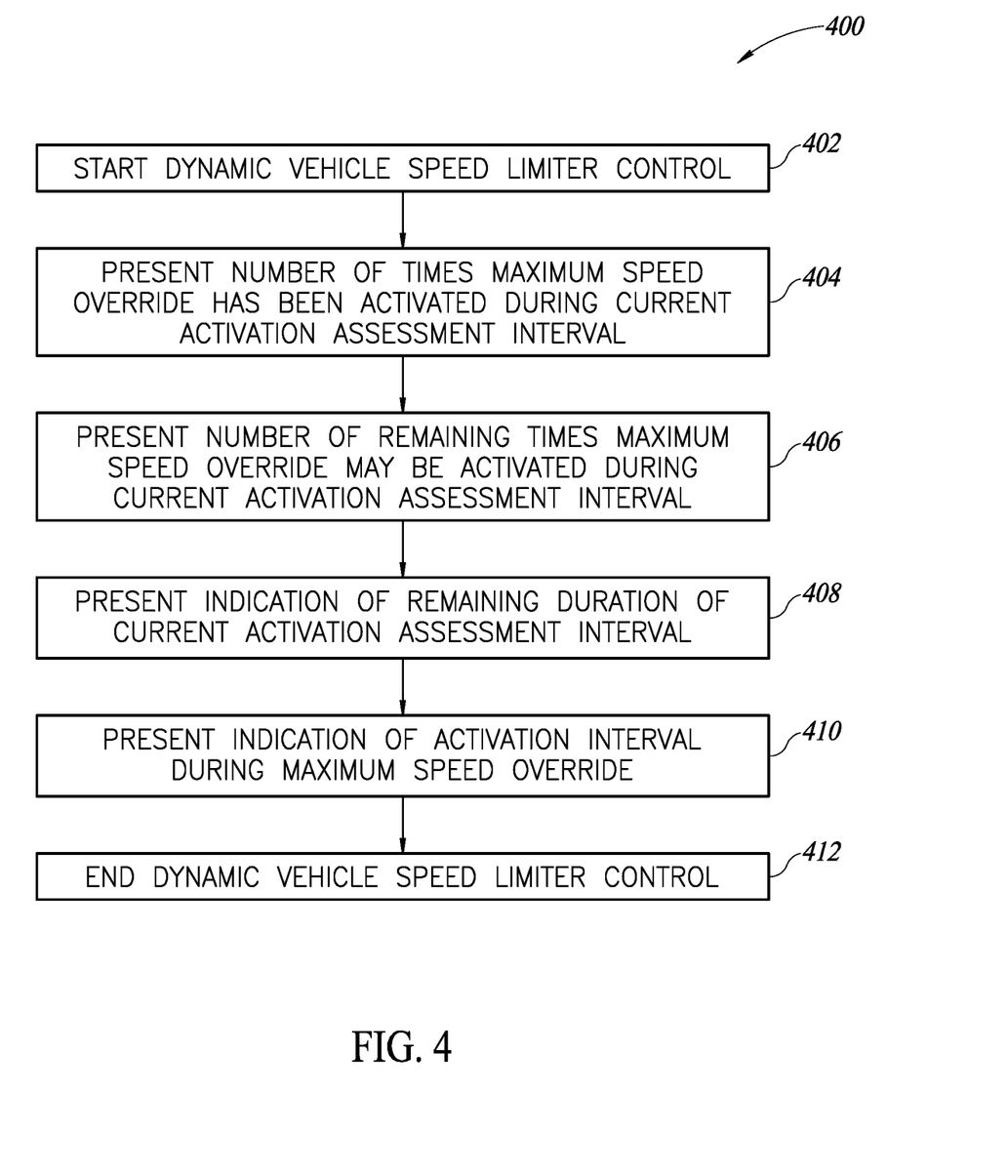
FIG. 4 is a flow diagram for a method of operating a user interface of a DVSL system to present information to an operator of a vehicle, according to one non-limiting illustrated implementation.

FIG. 4 is a flow diagram for a method 400 of implementing a user interface of a DVSL system to present information to an operator of a vehicle. It should be appreciated that the acts of the method 400 may be performed in any order or concurrently. Further, in various implementations one or more of the acts may be omitted. The method 400 begins at 402, wherein the DVSL system starts a dynamic vehicle speed limiter control operation for a vehicle. For example, the method 400 may start when an operator of the vehicle starts the engine of the vehicle and begins driving the vehicle on a highway or other road.

At 404, the DVSL system may present the number of times the maximum speed override condition has been activated during a current activation assessment interval. At 406, the DVSL system may additionally or alternatively present the number of remaining times the maximum speed override condition may be activated during the current activation assessment interval, which is the difference between the threshold number of activations and the number of times the maximum speed override has been activated during the current activation assessment interval. At 408, the DVSL system may present an indication of the remaining duration (e.g., minutes, miles) of the current activation assessment interval. At 410, the DVSL system may present an indication of the activation interval during a maximum speed override condition. For example, if the activation interval for each maximum speed override activation is one minute, the DVSL system may present an indication of the remaining time left in a current activation interval. Such indication may be visual (e.g., countdown timer, notification that only 15 seconds remain) or audible (e.g., chimes, voice notifications). At 412, the DVSL system may end the dynamic vehicle speed limiter control process, for example, in response to the operator turning off the engine of the vehicle.

Figure 5:
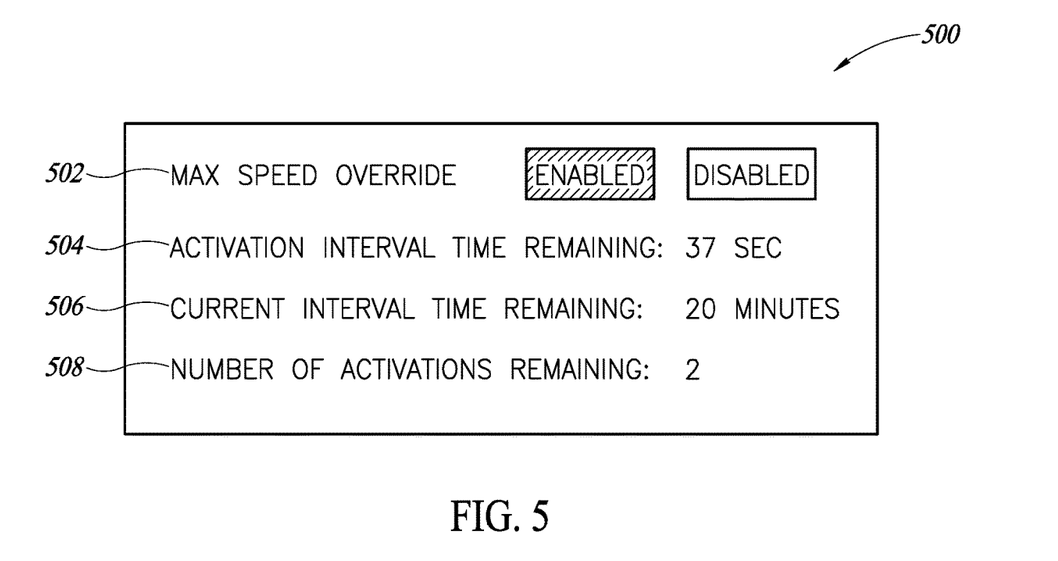
FIG. 5 is a diagram of a graphical user interface a DVSL system, according to one non-limiting illustrated implementation.

FIG. 5 is a simplified exemplary diagram of a graphical user interface 500 for a DVSL system according to one or more embodiments of the present disclosure. In this example, the activation assessment interval is a time period (e.g., 1 hour, 2 hours), and the activation interval is also a time period (e.g., 1 minute, 3 minutes). The user interface 500 includes a maximum speed override status indicator 502 that indicates whether the maximum speed override condition is currently enabled (as shown) or disabled. The user interface 500 also includes an indicator 504 that presents the amount of time remaining (e.g., 37 seconds) in a current activation interval. The user interface 500 also includes an indicator 506 that presents the time remaining (e.g., 20 minutes) in the current activation assessment interval. The user interface 500 further includes an indicator 508 that presents the number of activations remaining (e.g., 2 activations) in the current activation assessment interval.

Figure 6:
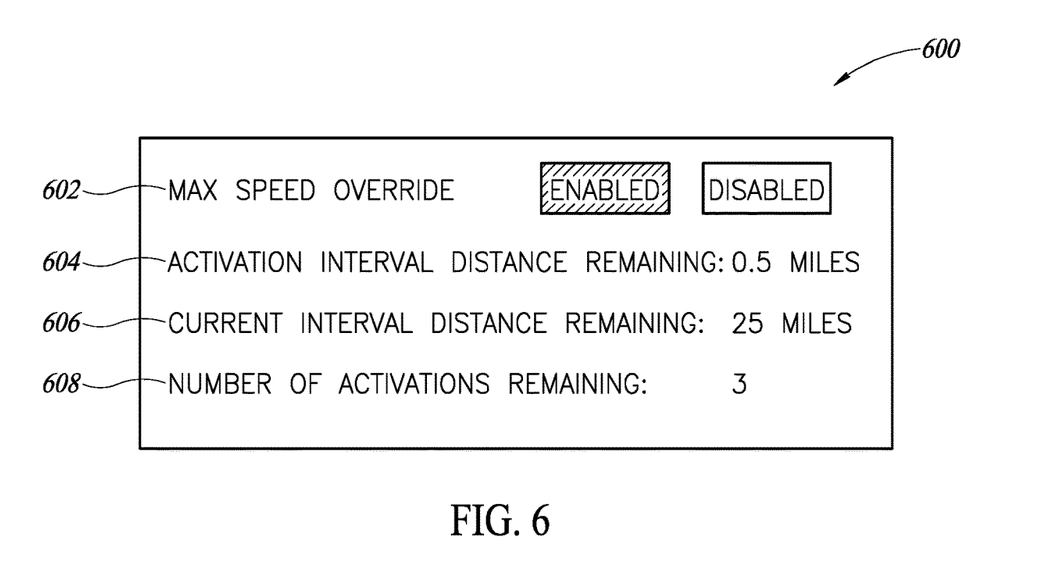
FIG. 6 is another diagram of a graphical user interface a DVSL system, according to one non-limiting illustrated implementation.

FIG. 6 is a simplified exemplary diagram of a graphical user interface 600 for a DVSL system according to one or more embodiments of the present disclosure. In this example, the activation assessment interval is a distance (e.g., 50 miles, 100 miles), and the activation interval is also a distance (e.g., 1 mile, 2 miles). It should be appreciated that in at least some embodiments, the activation assessment may be one of a time period or distance, and the activation interval may be the other of a time period of distance. The user interface 600 includes a maximum speed override status indicator 602 that indicates whether the maximum speed override condition is currently enabled (as shown) or disabled. The user interface 600 also includes an indicator 604 that presents the distance remaining (e.g., 0.5 miles) in a current activation interval. The user interface 600 also includes an indicator 606 that presents the distance remaining (e.g., 25 miles) in the current activation assessment interval. The user interface 600 further includes an indicator 608 that presents the number of activations remaining (e.g., 3 activations) in the current activation assessment interval.

The user interfaces 500 and 600 are provide as non-limiting example user interfaces. In at least some implementations, the DVSL system may provide a user interface that includes different information than that shown in FIGS. 5 and 6. Further, a user interface may include graphical information (e.g., bars, needles, animations) or other interface elements to effectively communicate information to the operator. Additionally or alternatively, the DVSL system may include an audio user interface (e.g., speaker, microphone) that receives control input via voice commands and provides information via audio (e.g., voice notifications, chimes).

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of limiting a maximum road speed of a vehicle, the method comprising:
   limiting, by at least one processor of the vehicle, a road speed of the vehicle to a first speed;
   receiving, by the at least one processor, a request for an override for the vehicle to exceed the first speed;
   determining, by the at least one processor, a number of times the override for the vehicle to exceed the first speed has been activated during a current activation assessment interval; and
   in response to determining that the number of times the override for the vehicle to exceed the first speed has been activated during the current activation assessment interval is below a threshold number of activations per activation assessment interval, wherein the threshold number of activations is greater than or equal to two activations per activation assessment interval:
      limiting, by the at least one processor, the road speed of the vehicle to a second speed higher than the first speed for an activation interval, wherein the activation interval is a predetermined, fixed distance when the override is activated and wherein the activation interval resets each time a condition for the override is enabled;
      causing concurrent display of distance-based statuses of the current activation assessment interval and of the activation interval; and
      responsive to expiration of the activation interval, limiting, by the at least one processor, the road speed of the vehicle to the first speed after the activation interval.

2. The method of claim 1 wherein determining a number of times the override has been activated during a current activation assessment interval comprises determining a number of times the override has been activated during a current activation assessment interval, the current activation assessment interval being defined by a time period.

3. The method of claim 1 wherein determining a number of times the override has been activated during a current activation assessment interval comprises determining a number of times the override has been activated during a current activation assessment interval, the current activation assessment interval being defined by a distance.

4. The method of claim 1 wherein determining a number of times the override has been activated during a current activation assessment interval comprises determining a number of times the override has been activated during a current activation assessment interval, the current activation assessment interval being defined by a current trip, between two complete shutdowns of operation, of the vehicle.

5. The method of claim 1 wherein receiving a request for the override comprises receiving the request for the override from a user interface positioned at or proximate to a steering wheel of the vehicle, a dashboard of the vehicle, or a pedal of the vehicle.

6. The method of claim 1, further comprising:
   causing a user interface of the vehicle to present at least one of:
      the number of times the override has been activated during the current activation assessment interval; or
      a difference between the threshold number of activations and the number of times the override has been activated during the current activation assessment interval.

7. The method of claim 1 wherein the concurrent display of distance-based statuses of the current activation assessment interval and of the activation interval comprises concurrent display of remaining distances, respectively, of the current activation assessment interval and of the activation interval.

8. The method of claim 1, further comprising:
   receiving, by the at least one processor, values for the first speed and the second speed; and
   storing, by the at least one processor, the received values for the first speed and the second speed in a nontransitory processor-readable storage medium.

9. The method of claim 1, further comprising:
   receiving, by the at least one processor, a value for the threshold number of activations; and
   storing, by the at least one processor, the received value for the threshold number of activations in a nontransitory processor-readable storage medium.

10. The method of claim 1, further comprising:
    receiving, by the at least one processor, a parameter that defines a length of the activation interval; and
    storing, by the at least one processor, the parameter that defines the length of the activation interval in a non-transitory processor-readable storage medium.

11. The method of claim 10 wherein receiving a parameter that defines the activation interval comprises receiving a parameter that specifies a distance.

12. The method of claim 1, wherein the concurrent display of distance-based statuses is based, at least in part, on presenting non-numerical graphics.

13. The method of claim 12, wherein the non-numerical graphics includes at least one of bars, needles, or animations.

14. The method of claim 1, further comprising causing display of a remaining number of times allowed for speed override during the current activation assessment interval, concurrently with the display of distance-based statuses of the current activation assessment interval and of the activation interval.

15. A vehicle speed management system operative to limit a maximum road speed of a vehicle, the vehicle speed management system comprising:
- at least one nontransitory processor-readable storage medium that stores at least one of processor-executable instructions or data; and
- at least one processor communicatively coupled to the at least one nontransitory processor-readable storage medium, in operation, the at least one processor:
  - limits a road speed of the vehicle to a first speed;
  - receives a request for an override for the vehicle to exceed the first speed;
  - determines a number of times the override for the vehicle to exceed the first speed has been activated during a current activation assessment interval; and
  - in response to a determination that the number of times the override for the vehicle to exceed the first speed has been activated during the current activation assessment interval is below a threshold number of activations per activation assessment interval, wherein the threshold number of activations is greater than or equal to two activations per activation assessment interval:
    - limits the road speed of the vehicle to a second speed higher than the first speed for an activation interval, wherein the activation interval is a predetermined, fixed distance when the override is activated and wherein the activation interval resets each time a condition for the override is enabled;
    - causes concurrent display of distance-based statuses of the current activation assessment interval and of the activation interval; and
    - responsive to expiration of the activation interval, limits the road speed of the vehicle to the first speed after the activation interval.

16. The vehicle speed management system of claim 15 wherein the current activation assessment interval is defined by a time period.

17. The vehicle speed management system of claim 15 wherein the current activation assessment interval is defined by a distance.

18. The vehicle speed management system of claim 15 wherein the current activation assessment interval is defined by a current trip, between two complete shutdowns of operation, of the vehicle.

19. The vehicle speed management system of claim 15 wherein the at least one processor receives the request for the override from a user interface positioned at or proximate to a steering wheel of the vehicle, a dashboard of the vehicle, or a pedal of the vehicle.

20. A vehicle speed management system operative to limit a maximum road speed of a vehicle, the vehicle speed management system comprising:
- at least one nontransitory processor-readable storage medium that stores at least one of processor-executable instructions or data; and
- at least one processor communicatively coupled to the at least one nontransitory processor-readable storage medium, in operation, the at least one processor:
  - limits a road speed of the vehicle to a first speed;
  - receives a request for an override for the vehicle to exceed the first speed, from an operator of the vehicle via a control input interface;
  - determines a number of times the override for the vehicle to exceed the first speed has been activated during a current activation assessment interval;
  - in response to a determination that the number of times the override for the vehicle to exceed the first speed has been activated during the current activation assessment interval is below a threshold number of activations per activation assessment interval, wherein the threshold number of activations is greater than or equal to two activations per activation assessment interval:
    - limits the road speed of the vehicle to a second speed higher than the first speed for an activation interval, wherein the activation interval is a predetermined, fixed distance when the override is activated and wherein the activation interval resets each time a condition for the override is enabled; and
    - responsive to expiration of the activation interval, limits the road speed of the vehicle to the first speed after the activation interval; and
  - causes a user interface of the vehicle to concurrently present distance-based statuses of the current activation assessment interval and of the activation interval.

21. The vehicle speed management system of claim 20, further comprising:
- receiving, by the at least one processor, programmable settings data that comprises at least one of values for the first speed and the second speed, a value for the threshold number of activations, or a parameter that defines the duration of the activation interval; and
- storing, by the at least one processor, the received programmable setting data in the at least one nontransitory processor-readable storage medium.

22. The vehicle speed management system of claim 20 wherein the at least one processor receives the request for the override from a user interface positioned at or proximate to a steering wheel of the vehicle, a dashboard of the vehicle, or a pedal of the vehicle.

* * * * *